United States Patent
Guichard et al.

(10) Patent No.: US 7,528,733 B2
(45) Date of Patent: May 5, 2009

(54) SECURITY CASE AND METHOD OF MANUFACTURE

(75) Inventors: Alex Guichard, La Chapelle du Mont du Chat (FR); Bruno Bonnevie, Cognin (FR)

(73) Assignee: Roctool, Le Bourget du Lac (FR)

( * ) Notice: Subject to any disclaimer, the term of this patent is extended or adjusted under 35 U.S.C. 154(b) by 202 days.

(21) Appl. No.: 11/077,318

(22) Filed: Mar. 10, 2005

(65) Prior Publication Data

US 2005/0245193 A1    Nov. 3, 2005

(30) Foreign Application Priority Data

Mar. 11, 2004  (FR) .................................. 04 02661
Dec. 20, 2004  (FR) .................................. 04 13688

(51) Int. Cl.
  *G08B 21/00* (2006.01)
(52) U.S. Cl. ....................... 340/657; 340/550
(58) Field of Classification Search ................. 340/657, 340/550, 647, 568.2, 598; 109/21, 58; 200/61.08, 200/DIG. 12
See application file for complete search history.

(56) References Cited

U.S. PATENT DOCUMENTS

| | | | | |
|---|---|---|---|---|
| 3,633,194 A | * | 1/1972 | Kothe | 340/550 |
| 4,954,811 A | * | 9/1990 | Chatigny et al. | 340/550 |
| 5,675,319 A | * | 10/1997 | Rivenberg et al. | 340/550 |
| 5,734,323 A | * | 3/1998 | Hermes et al. | 340/540 |
| 6,215,397 B1 | * | 4/2001 | Lindskog | 340/550 |
| 6,535,126 B2 | * | 3/2003 | Lin et al. | 340/550 |
| 7,088,257 B2 | * | 8/2006 | Weekes | 340/652 |

\* cited by examiner

*Primary Examiner*—John A Tweel, Jr.
(74) *Attorney, Agent, or Firm*—Fay Sharpe LLP

(57) ABSTRACT

A security case includes a shell (1) formed of a wall or lining (2) made of a layered composite material. The wall or lining (2) has at least three layers (3, 4, 5) including two conductive layers (3, 5) made of an electrically conductive material between which is sandwiched an intermediate insulating layer (4) made of an electrically insulating material.

9 Claims, 3 Drawing Sheets

SECURITY CASE AND METHOD OF MANUFACTURE

BACKGROUND OF THE INVENTION

The present invention concerns a security case, such as a container, including a shell that defines a suitcase valise or a transportation container for funds or valuables. But the invention can also concern any merchandise containers, protection cases, cash register drawers, bills distributors, see through quarters and panels and hooding used for security and/or order ends.

The invention more particularly concerns a reinforced case of which the shell is made of a composite laminate material having variable electric characteristics according to their applications.

One already knows, suitcases with protection systems, but the current systems present weaknesses that allow people to neutralize their security.

One already knows containers secured by a voluntary manual action, containers secured by a state change of a specific element of the aforementioned container, (locks, hinges, local sensor, etc. . . . ), metallic containers, generally aluminum to reduce the weight.

One knows also containers in epoxy composite including an electronic mesh or a metallic grid, overjackets in polyester (made in projection) with an imprinted circuit adhered on the internal faces. But the systems of electronic mesh (imprinted circuits adhered on a face) do not allow fabrication of objects of any form (it is limited to flat rectangular plates).

All the already known devices are an advancement in the security field, but are not totally reliable, and the invention proposed will remedy the drawbacks of the traditional systems.

SUMMARY OF THE INVENTION

The present invention wants to resolve the drawbacks of the current devices while proposing a case or the like, such as a drawer or bills distributor, designed to protect or destroy all valuables coveted by thieves, a particularly reliable container and designed to be produced industrially.

The case of the invention can be a simple valise, or a security bag making a complete assembly.

The solution according to the invention concerns a reinforced case made of a shell formed by a wall or lining of a laminate composite material, characterized in that this wall or lining includes at least three layers, two conducting layers made of an electronically conducting material with an intermediate insulating layer between, which is made of an electrical insulating material.

According to the preferred embodiment, the case forms a container.

According to a characteristic of the invention, the two conducting layers of the wall or lining form the shell including an assembly of electric connections, such as illustrated in FIG. 3.

According to another characteristic of the invention, each of the conducting layers includes two connections, known as an electrical supply connection and a connection for electrical measurements, so that under an electric supply of each conducting layer (3,5), the wall or lining with its insulating intermediary behaves as a sensitive compactor to all physical modification of its structure.

According to another characteristic of the invention, the case includes a circuit board or electronic circuit and an electric supply, in order to detect a variation of resistance and/or capacitance and to use it to generate information.

According to an advantageous characteristic of the invention, the conducting layers made of conductive material are made of a resin including a load or a conducting agent.

According to one variation, the resins are thermal setting.

According to another variation, the resins are thermoplastic.

The invention equally concerns a procedure to make the case such as described above, characterized in that it includes the following steps:

The step of formulating at least a composite of an electrically conductive organic type, The step of making a multilayer laminate composite material, the aforementioned composite material having at least two electrical conducting layers of the aforementioned organic kind of material and at least an intermediary layer of an electrically insulating material, The step of making shells by thermoforming of the aforementioned multilayer laminate composite material, The step of making a case like container with at least one of the aforementioned shells, such as illustrated in FIG. 4.

The step of connecting an electric supply connection edge and each of the aforementioned layers made of the aforementioned materials, organic electrical conductors, The step of connecting a connection edge for electric measurements and each of the aforementioned layers made of the aforementioned electrical conductive organic type material, The step of supplying the aforementioned conducting layers made of the aforementioned organic material, electrical conductor by an electric current of appropriate intensity (I) and under an appropriate voltage (U).

The invention, lastly, concerns a procedure to fabricate the case such as mentioned above, characterized in that it includes, thanks to an electric circuit, of the following steps:

Measuring resistance values (Rc) and/or capacitance (Cc) of its multilayer laminate composite material, Generation of electric information (If) which is a function of the resistance values and/or capacitance of the multilayer laminate composite material.

Other characteristics and advantages of the invention will be shown in the description that follows in regards to the annexed drawings which are given as non-limiting examples.

DETAILED DESCRIPTION OF THE PREFERRED EMBODIMENTS

The container made according to the procedure of the invention includes a shell 1 formed by a wall or lining 2 of a laminate composite material including at least three layers 3, 4, 5, as previously known, two of which are conducting layers 3, 5 made of an electrical conducting material with an insulating intermediary layer 4 constituted of an electrically insulating material, between.

Figure 3:
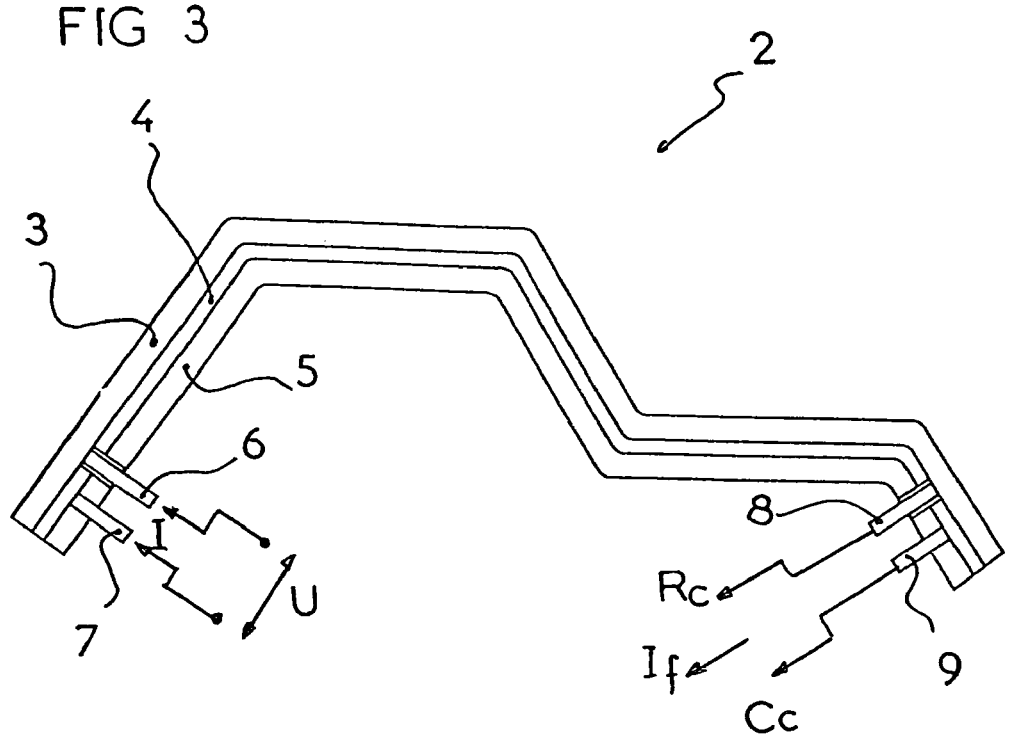
FIG. 3 is a cross-sectional view of the step that supplies the aforementioned conducting layers of the aforementioned organic electrical conductor material by an electric current.

According to the invention the two conducting layers 3, 5 of the wall or lining 2 form the shell (1) including an assembly of electrical connections 6, 7, 8, 9, such as illustrated in FIG. 3.

Thus, each of the conducting layers 3, 5 includes two connections, such as previously known an electrical supply connection 6, 7, and a connection for electrical measurements 8, 9.

Under an electrical supply to each conducting layer 3, 5, the wall or lining 2 with its insulating intermediary behaves as a sensitive compactor to all physical modifications of the case's structure. The approach of the conducting layers 3, 5 or the establishment of an electrical bridge between these layers modifies the resistance and/or capacitance values of the wall or lining 2.

The detection of a variation of these values is then used to generate information.

Thus at the time of a break-in attempt the change of the resistance of the wall or lining of the container, generates electrical information to a control unit that activates the security system. The aforementioned system being, for example, a deterioration device of the contained valuables in the container, like for example ink for defacing bank notes, a deterioration of the assembled container or the transmission to a surveillance center that the container is in non-authorized hands.

Thanks to the container of the invention, 100% of the surface of the object is operational.

Besides, the invention allows:
To use the laminate composite materials allowing the fabrication of any form of objects in industrial conditions at the least cost.
To be used in an industrial context (put in forms of composites) therefore destined to have applications of large quantities at optimized costs.
A reliability and sensitiveness of the detection method of the variation of electrical values evolving with any physical modification of the structure of the object (for example: temperature, fracture, drilling, pressure, etc. . . . ) on 100% of the surface of the object.

The invention also allows the fabrication of objects of any form intended for technical applications.

The conducting layers 3, 5 can be made in a plastic resin with a charge conducting agent.

Usable resins include, resins such as, polyester, epoxies, or any thermoplastic resins, for example, polyethylene, polypropylene, polyamide, or PET.

The charge conducting agent can be made from graphite, carbon, metallic powders, or carbon nano fibers.

Additionally, the intermediary insulating layer 4 is a polarizable electric insulation, so to say having dielectric properties.

The invention also concerns the fabrication of the container.

Figure 1:
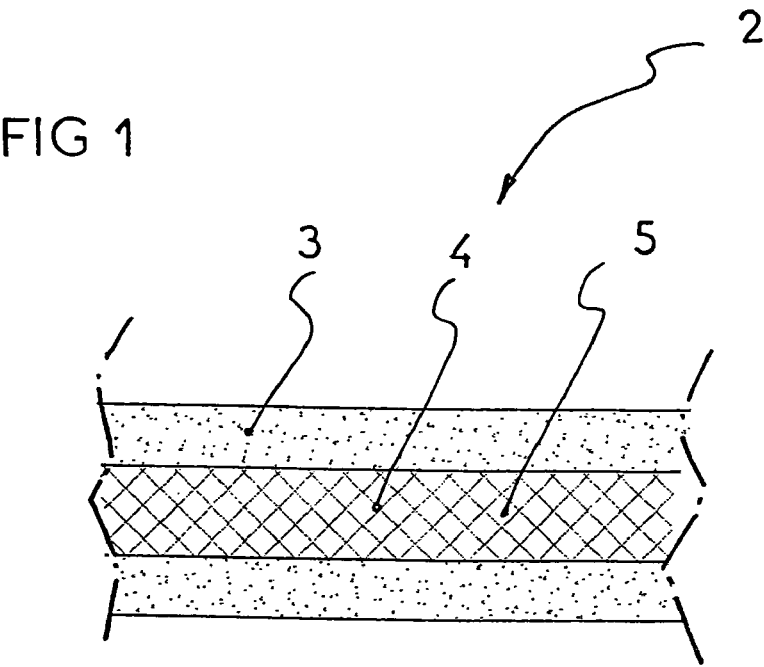
FIG. 1 is a cross-sectional view of the material making up a container wall, according to the invention.
Figure 2:
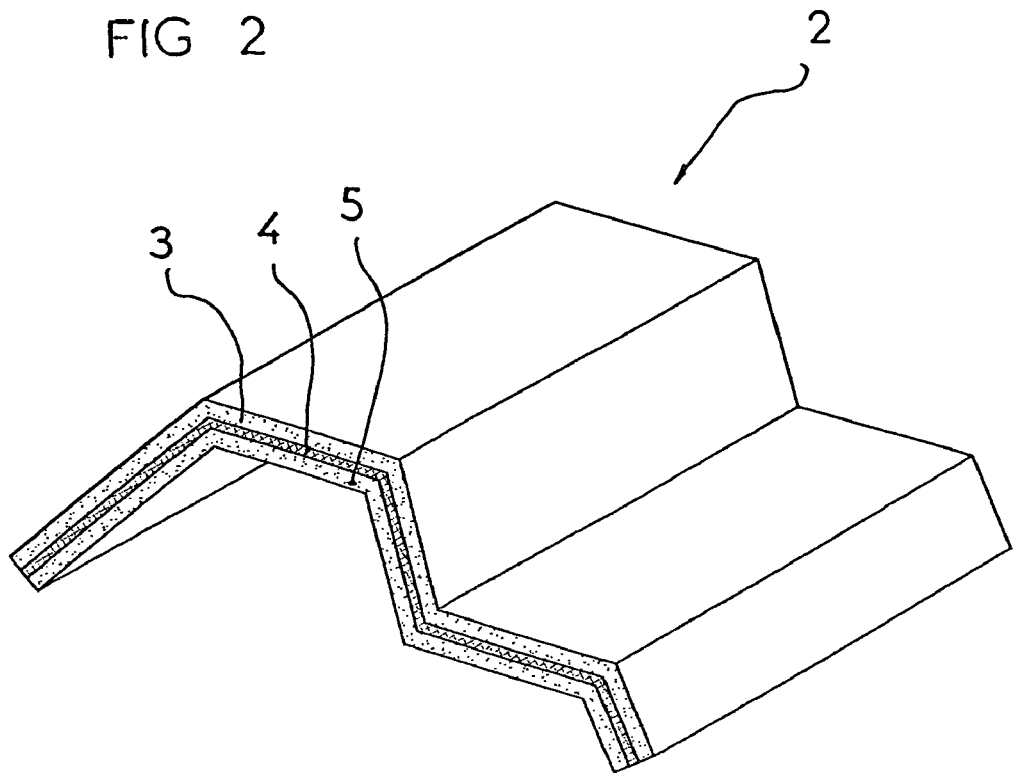
FIG. 2 is a perspective view of the step of the procedure that generates the shells by thermoforming of the material constituting the wall or lining of the container.
Figure 4:
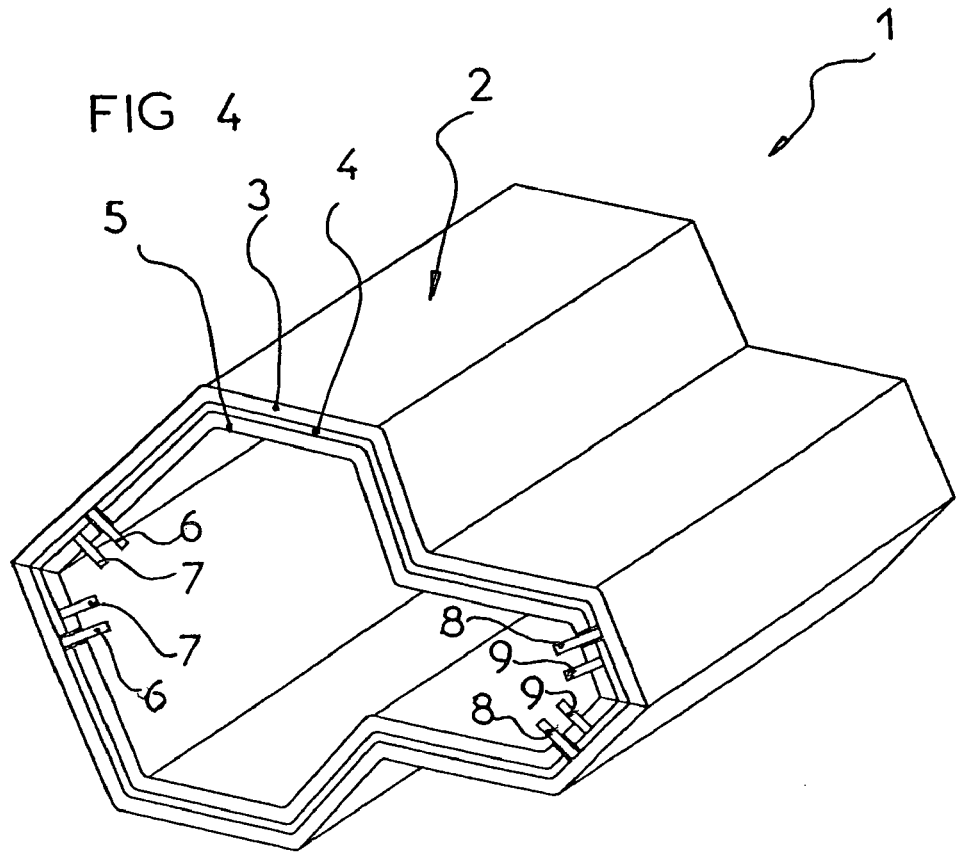
FIG. 4 is a schematic of a fully-made object, according to the invention, in a transverse view

The procedure of the invention allows the fabrication of containers including shells of any form made in laminate composite materials able to generate electric information in regards to activating an command or a security system, the aforementioned one procedure uses the following steps:
The step that formulates at least one composite material of electrical conductive organic type material 3, 5.
The step that fabricates a multilayer laminate composite material 2, the aforementioned composite material 2 including at least two electrical conducting layers made of the aforementioned organic material 3, 5 and at least one intermediary layer of an electrically insulating material 4, such as illustrated in FIG. 1.
The step that fabricates the shells 1 are made by thermo-forming the aforementioned multilayer laminate composite material 2,
The step that fabricates a container with at least one of the aforementioned shells 1, such as illustrated in FIG. 4.
The step that connects connecting edges of each of the aforementioned layers made of the aforementioned electrical conducting organic materials 1 to electric supply 6 and 7,
The step that connects a connection edge of each of the aforementioned layers made of the aforementioned electrical conducting organic materials 1 with electric measurement contacts 8 and 9.
The step that supplies the aforementioned conducting layers made of the aforementioned electrical conducting organic material 1 with an electric current of appropriate intensity (I) and under an appropriate voltage (U).

The fabrication step of the shells can be fabricated by thermo-compression or any other injection procedures.

The security functioning of the container includes an electronic circuit which achieves the following steps:
Measuring resistance values (Rc) and/or capacitances (Cc) of the multilayer laminate composite material 2.
Generation of electrical information (If) as a function of the resistance values and/or capacitances of the multilayer laminate composite material 2.

Additionally, the external conducting layer 3 of the wall or lining 2 acts as, for example, the negative pole, while the internal conducting layer 5 acts as the positive pole.

Also noting, in the framework of the invention, the conducting layers are advantageously supplied by an alternate current.

Also noting that one could cover the external layer 3 in a protective casing which is designed to protect the container from shocks and vibrations. This layer could be, for example, a polyurethane foam.

Figure 5:
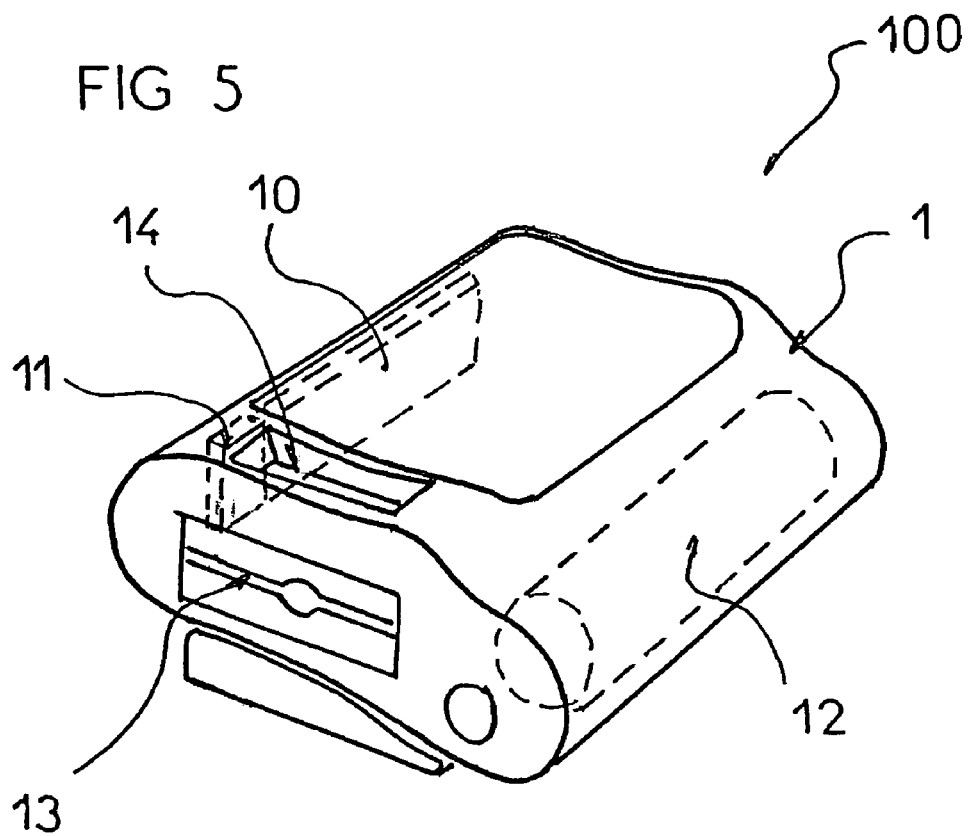
FIG. 5 is a perspective view of a container.

FIG. 5 is an example of a fabricated container, that includes an electronic circuit board 10, an electric supply battery 11, and a defacing unit 12. The container serves, for example, as a depository for banknotes that are introduced via a frontal slit 13, while an upper part includes a bill counter 14. As previously, the offence of deterioration of the shell, causes a variation of the resistance, and this information is transmitted to a trigger that causes the defacing of the banknotes to render them unusable.

Also noting, the invention is not limited to the fabrication methods described and represent in the title examples, but also includes all technical equivalents as well as their combinations.

The invention claimed is:

1. A security case forming a container, comprising:
a shell formed by a wall or lining fabricated totally of a laminate composite material, the wall or lining including at least three layers, having at least two of the layers conducting layers constituted by an electrical conducting material sandwiching in between an insulating intermediary layer made of an electrical insulating material, the conducting layers being made of an organic resin impregnated with a charge carrier or conducting agent, and
wherein the two conducting layers of the wall or lining that form the shell include an array of electric connections, and wherein each of the conducting layers includes two connections, an electric supply connection and an electric measurement connection, so that under an electric supply to each layer, the wall or lining with its insulating intermediary layer behaves as a capacitor sensitive to physical modification to the structure, and wherein the case includes an electric supply and an electronic circuit which detects a variation of at least one of resistance or capacitance and generates a signal indicative thereof and an electronic circuit connected with the conductive plastic layers which detects changes in electrical properties of the shell.

2. The case according to claim 1, wherein the charge carrier or the conducting agent is made of graphite, carbon, metallic powders, or carbon nano fibers.

3. The case according to claim 2, wherein the resin is a thermoplastic resin.

4. A fabrication method for the case according to claim 3, including:

forming a composite material made of an organic type of electrical conductor, thermoforming the laminate composite material which includes the at least two electrical conducting layers of the organic type material and the at least one intermediary layer of an electrical insulating material, connecting electrical supply contacts to each of the aforementioned layers made of the aforementioned organic type electrical conductive material, connecting electrical measurement contacts to each of the aforementioned layers made of the aforementioned organic type electrical conductive materials, supplying the aforementioned conducting layers of the aforementioned organic type electrical conductive material with an electric current and voltage.

5. The method of fabricating the case according to claim 4, further including with an electronic circuit:

measuring at least one of resistance values and capacitance of the case's multilayer wall or lining, and, generating electrical signals as a function of the measured resistance values and capacitance of the multilayer wall or lining.

6. The case according to claim 3, wherein the resin is polyethylene, or polypropylene, or polyamide or PET.

7. The case according to claim 3, wherein the resin is a thermal setting resin.

8. The case according to claim 7, wherein the resin is polyester or epoxyde.

9. A security case comprising:

a structural shell formed entirely of a multilayer plastic composite including at least two electrically conductive plastic layers separated by an electrically insulating thermoplastic resin layer, the electrically conductive layers including a thermoplastic resin layer impregnated with a charge carrier or conducting agent and the electrically insulating layer is thermoplastic resin layer; and, a circuit connected with the conductive plastic layers which detects changes in electrical properties of the shell such that the circuit detects tampering to any and every point on the shell, wherein the multilayer plastic composite is thermally formed as a unit into a preselected configuration to form the shell.

* * * * *